April 25, 1967 W. M. KARLYN 3,315,780
ARTICLE TRANSFER MECHANISM FOR DECORATING AND DRYING APPARATUS
Filed Sept. 21, 1965 3 Sheets-Sheet 1
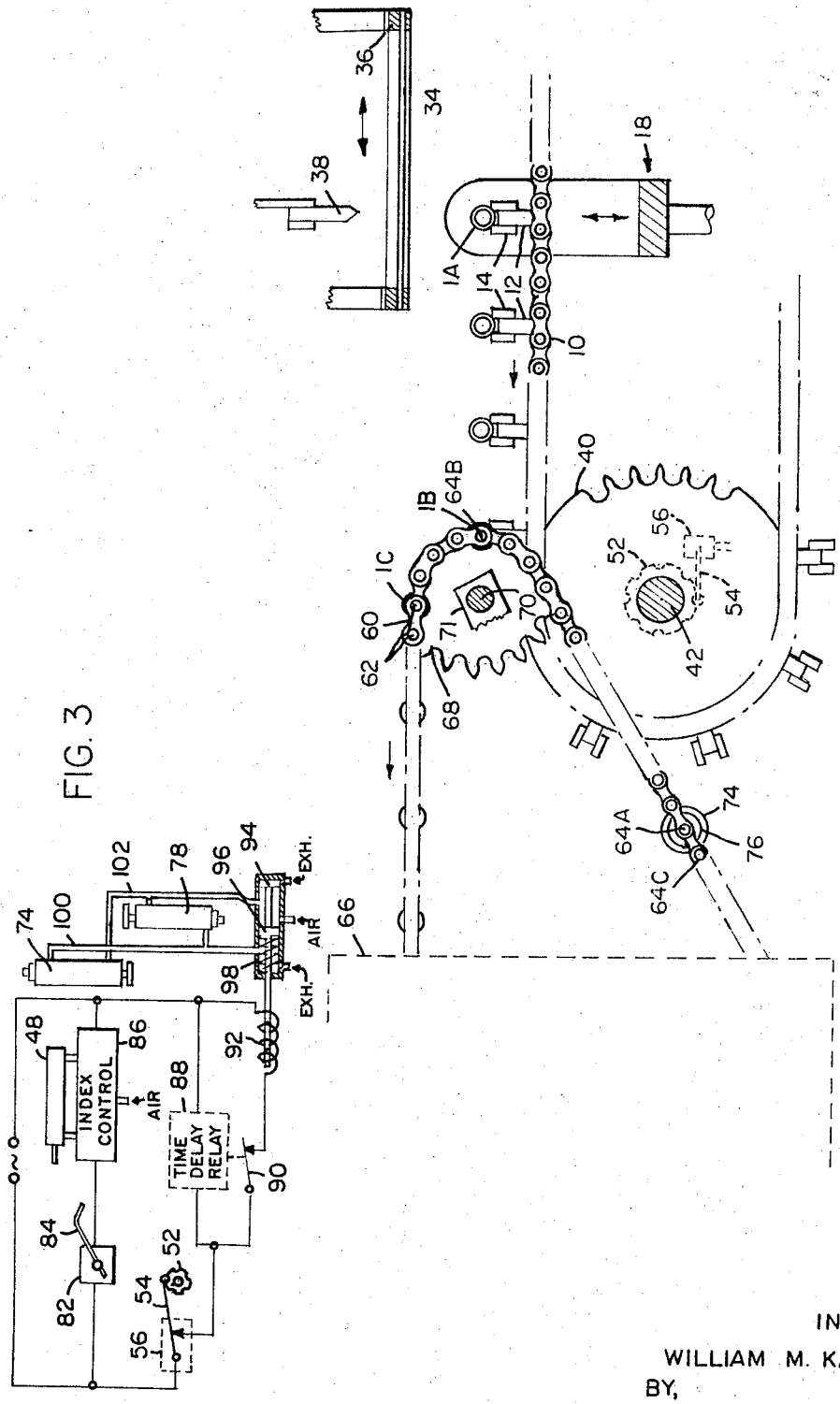
INVENTOR
WILLIAM M. KARLYN
BY,
Kenway, Jenney & Hildreth
ATTORNEYS

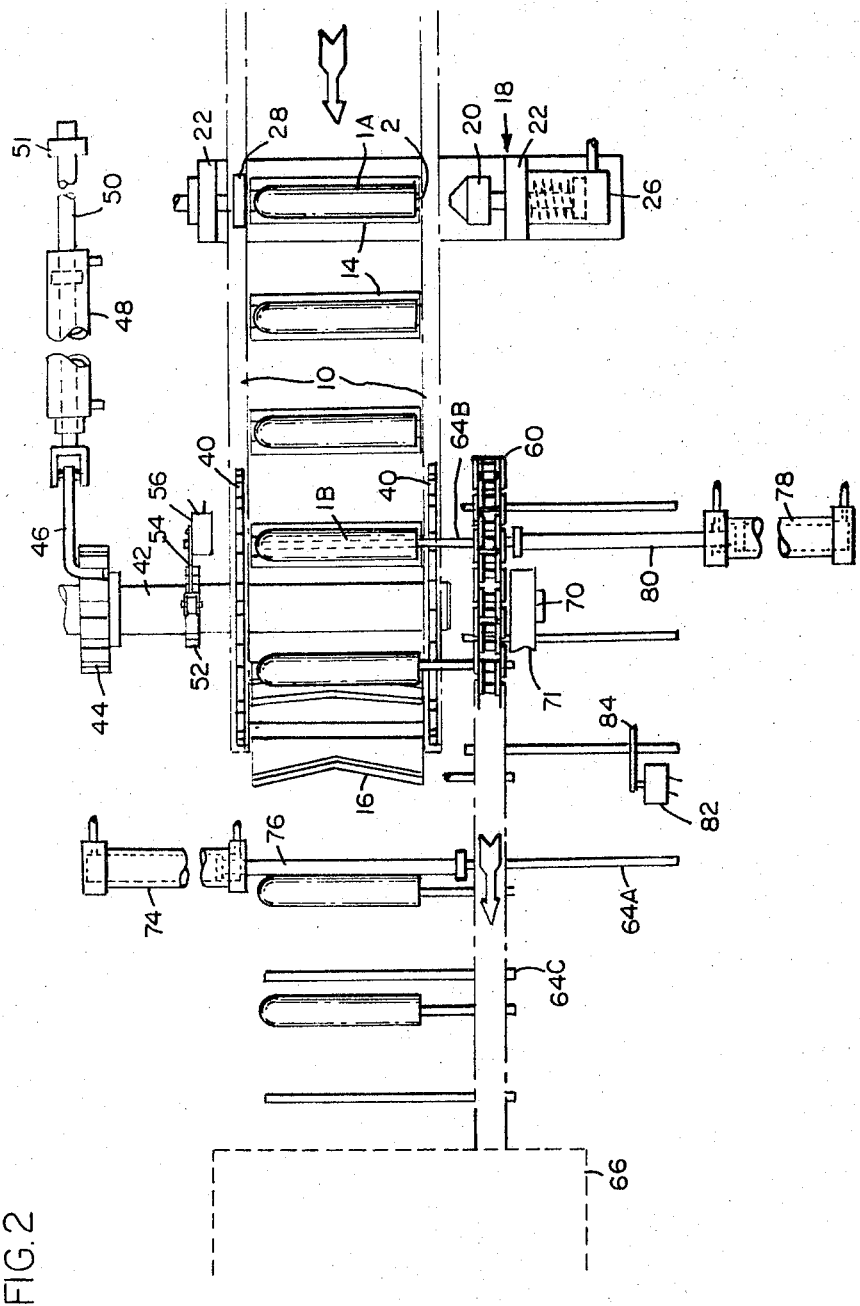

United States Patent Office 3,315,780
Patented Apr. 25, 1967

3,315,780
ARTICLE TRANSFER MECHANISM FOR DECORATING AND DRYING APPARATUS
William M. Karlyn, 18 Merritt St.,
Marblehead, Mass. 01945
Filed Sept. 21, 1965, Ser. No. 488,892
4 Claims. (Cl. 198—20)

This invention relates to an improved article transfer mechanism, which has particular utility in connection with decorating and drying apparatus of a type which applies designs or printing in a liquid medium to a succession of articles carried on a first conveyor, and then transfers the articles to a second conveyor for passage through a drying oven. However, the invention has general utility for the transfer of articles from a transfer station onto a moving conveyor.

The present invention has as its primary object the provision of an improved article transfer mechanism. It is a further object to provide a simplified yet reliable mechanism for delivering articles from a transfer station to a conveyor, or from one conveyor to another. It is still another object to afford an improved decorating and drying apparatus. Additional objects and advantages of the invention will appear as the following description proceeds.

Briefly stated, according to a preferred embodiment thereof, I may carry out my invention by mounting a series of pin means in an endless receiving conveyor for sliding movement between extended and retracted positions; by arranging first positioning means to slide the pin means sequentially to an extended position upon arrival at a transfer station for picking up articles; and by providing second positioning means to retract the pin means prior to their return to the transfer station.

In a preferred form, the receiving conveyor comprises a roller chain of a conventional type which has a series of openings extending transversely through the rollers and links; the pin means are slidably received through these openings. The pin shift is perpendicular to the plane path of the chain, into the parallel plane path of the delivering conveyor, for pick-up by extension into articles having end openings.

Various means for positioning the pins may be employed. Either of the positioning means may comprise an actuator having an extensible push-rod for axial engagement with the pins; this actuator may be electrically, magnetically, pneumatically, or hydraulically operated. Magnetic means may be used to act directly on pins of paramagnetic material. Either of the positioning means may consist of a stationary or movable cam having extent normal to the path of the receiving conveyor. And one or the other of the positioning means may comprise a series of compression springs, one associated with each pin means to bias them continuously toward either the retracted or extended position. In this last instance, the second positioning means may be a cam track or an actuator arranged to drive the pin means to the opposite position against the bias of the spring.

In a principal application, the articles are borne to the transfer station by a delivering conveyor having suitable article carriers. The paths of the two conveyors attain alignment at the transfer station, and their paths thereafter diverge so that the pin means engage and lift the articles from the carriers of the delivering conveyor.

The most widely used wet decorating process requires that a delivering conveyor advance a series of articles to and from a decorating station in intermittent discrete steps, and the conveyor is halted during the intervals required for decoration. However, it is generally preferred that the articles be advanced through a drying oven continuously by a receiving conveyor, although they may also be advanced intermittently through the oven. In either case, I prefer to utilize conveyor-synchronization control means such as disclosed in my copending U.S. patent application S.N. 479,241, filed Aug. 12, 1965. In addition, I provide improved control means for actuating the pin-positioning means in synchronism with the travel of the conveyors, to insure proper engagement of the pin means with articles at the transfer station.

While the specification concludes with claims particularly pointing out the subject matter which I regard as my invention, it is believed that a clearer understanding may be gained from the following detailed description of preferred embodiments, referring to the accompanying drawings, in which:

FIGURE 1 is a fragmentary view in front elevation of an illustrative embodiment of the invention, in which decoration of open-ended articles is performed by a silk screen stenciling process;

FIGURE 2 is a fragmentary plan view of the apparatus of FIGURE 1;

FIGURE 3 is a schematic diagram of control circuitry for the apparatus;

Figure 5:
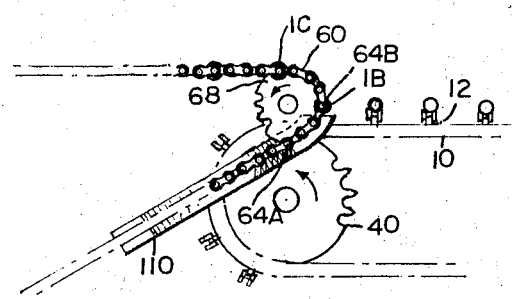
FIGURE 5 is a fragmentary view in front elevation of the apparatus of FIGURE 4.

Referring to FIGURES 1–3, a first embodiment of the invention is shown in conjunction with automatic apparatus for decorating a series of articles 1A, 1B, 1C, which are illustrated as casings for lipsticks or the like, each having an end opening at 2. The apparatus generally comprises a delivering or decorating conveyor 10; a silk screen decorating apparatus including a screen 34, a squeegee 38, and a carriage 18; a receiving or oven conveyor 60 for bearing wet decorated articles through an oven 66 for drying the articles; and transfer means, including a plurality of similar pins 64A, 64B, 64C, for removing successive articles from the conveyor 10 at a transfer station and carrying them through the oven to a delivery station, where they are removed from the pins by any suitable means (not shown), such as an air jet or a cam.

The stencilling mechanism shown is similar to that described in my copending application Ser. No. 479,241, filed Aug. 12, 1965, and entitled, "Synchronized Automatic Decorating and Drying Apparatus"; it includes a vertically-reciprocable carriage 18, having uprights 22 in one of which is rotatably mounted a chuck 28. An article at 1A may be gripped against the chuck by a tapered element 20, movable to and from the gripping position by a one-way spring-return pneumatic actuator 26. An article thus gripped is lifted by the carriage 18 from a carrier 12 of the conveyor 10, into rolling engagement with the lower surface of a silk screen 34 bearing any desired pattern. A squeegee 38 bears against the upper surface of the screen, in vertical alignment with the article to be decorated. A frame 36 is translated in one of the indicated directions, after applying a pool of suitable decorating medium to the upper surface of the screen, to apply the stencil pattern to the outer surface of the article. The stencilling mechanism in itself forms no part of the present invention, and further detailed description thereof is believed unnecessary.

Subsequent to decoration, each article is returned by the carriage 18 to its carrier 12. The carriers are mounted between double chains of the conveyor 10, and have parallel plates 14 formed with V notches 16 (FIGURE 2)

to engage the articles only at their ends, out of contact with the wet designs.

The conveyor 10 is driven intermittently through a sprocket 40 mounted on a drive shaft 42, by a double-acting pneumatic motor 48, whose piston rod 50 carries a pivoted pawl 46 for driving a ratchet 44 affixed to the drive shaft. The movement is limited by a stop 51 mounted on the piston rod. The conveyor is thus driven intermittently in discrete indexing steps to bring each successive article to the position of article 1A for stencilling, and subsequently to remove it for delivery.

An oven conveyor 60 is arranged to receive the wet articles, at a pick-up station occupied by one of the articles 1B in the drawings, and to bear them through a suitable oven 66 for drying. The conveyor 60 is of the roller chain type, and may be continuously or intermittently driven. An idler sprocket 68 is mounted upon a shaft 70 rotatably supported in a frame member 71, to guide the chain in aligned relation with the pick-up station, and thence in a path diverging from that of the conveyor 10.

A series of pins 64A, 64B, 64C are slidably received in transverse openings 62 through the rollers and links of the chain 60. Conveyor chain of this type is commercially available in various sizes, suitable for use with pins of thicknesses appropriate to the particular articles being handled.

The pins entering and leaving the oven 66 are in an extended position occupied by the pins 64B and 64C. A double-acting pneumatic actuator 74 is stationarily supported in alignment with a returning run of the chain, with its push-rod 76 parallel to the axes of the pins, for restoring successive pins to a retracted position exemplified by the pin 64A.

Upon arrival at the transfer station, in alignment with an article at 1B, each successive pin is driven to the extended position at 64B and into the article opening 2, by the co-axial push-rod 80 of a second double-acting pneumatic actuator 78. The article is then lifted up and away from its carriage 12 by the pin, because of the divergence of the path of the receiving chain 60 from that of the delivering conveyor 10, and carried through the oven. Subsequent to drying, the articles are removed by any suitable means (not shown) and the pins are returned in an extended, unloaded condition as exemplified at 64C.

The operation of the pin-extending actuator 78 must be synchronized with the arrival of each succeeding pin and article at the transfer station. To this end, a control switch 56 for the actuator 78 has a movable contact arm 54, which is arranged to ride upon a notched wheel 52 affixed to the drive shaft 42 of the conveyor 10. The notches of the wheel 52 are so spaced that the contact arm 54 is closed only at the conclusion of an indexing movement, when an article at 1B occupies the transfer position. Further, a normally-open control switch 82 has a contact arm 84 arranged to engage successive pins arriving in the retracted position as at 64A, for indexing the conveyor 10 in synchronism with the arrival of a pin in alignment with the transfer station, at at 64B. It is necessary that the contact arm 84 be spaced along the chain from the pin at 64B an even multiple of the spacing of adjacent pins.

Referring now to FIGURE 3, a control system incorporating the switches 56 and 82 is illustrated. The switch 82 is arranged, upon closing of the arm 84, to energize an index control 86 which reciprocates the actuator 48, thereby to index the conveyor 10 at intervals which synchronize the arrivals of each successive article and pin at the transfer station. This portion of the control system is disclosed and claimed by my aforementioned patent application Ser. No. 479,241.

The switch 56 is arranged to energize the coil 92 of a solenoid control valve 96 upon the completion of each indexing movement, thereby to draw a double spool 94 to the left as viewed in the drawing, against the bias of a compression spring 98. This movement applies air pressure from a suitable source through a branched conduit 100 to extend the push-rods of both of the actuators 74 and 78, while exhausting opposed chambers of the actuators through a branched conduit 102. The actuators thus return one pin to the retracted position at 64A, and extend another pin at 64B into an article at the pick-up station, simultaneously and in synchronism with the indexing movement.

The circuit energizing the coil 92 is completed through a normally-closed contact arm 90 of a time-delay relay 88; the relay is also energized by closure of the switch 56, and reopens the contact 90 after a short interval, prior to the succeeding indexing movement. The resulting de-energization of the coil 92 allows the spring 98 to return the spool 94 to the position illustrated in FIGURE 3, thus applying air pressure to retract the push-rods of the actuators 74 and 78.

Whether the receiving oven conveyor 60 is driven continuously or intermittently, synchronization of the conveyors and of the pin movements can be secured by using position-responsive control means actuated by the completion of motions of either conveyor or of the decorating apparatus.

Figure 4:
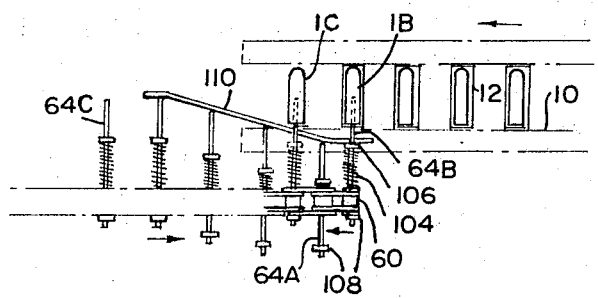
FIGURE 4 is a fragmentary plan view showing a modified transfer mechanism.

Referring now to FIGURES 4 and 5, a modification is shown in which the pin means are driven to the retracted position, as at 64A, by a cam track 110. Extension to the position of the pin 64B is secured by springs 104, each interposed between the chain 60 and a stop 106 affixed to a corresponding one of the pins. The pins are released as they reach the termination of the cam track 110, coincident with their arrival in alignment with an article as at 1B at the transfer station; their extension into the articles is limited by engagement of the chain with additional stops 108 affixed to the outer ends of the pins. After the articles are dried and removed, the pins return to the cam track 110 in an extended position, as at 64C.

Figure 6:
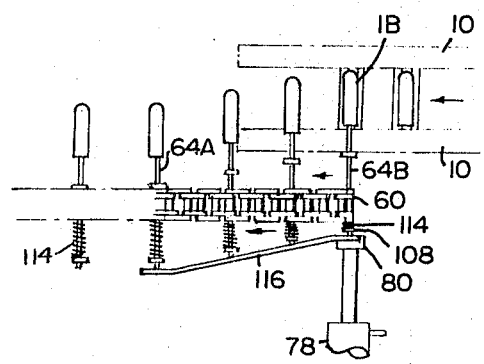
FIGURE 6 is a fragmentary plan view of another modification of the transfer mechanism.
Figure 7:
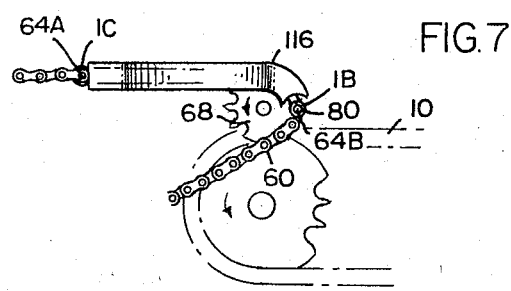
FIGURE 7 is a fragmentary view in front elevation of the apparatus of FIGURE 6.

In FIGURES 6 and 7, another modification is shown in which the pins are biased toward the retracted position, as at 64A, by compression springs 114 interposed between the chain 60 and the stops 108 at the outer ends of the pins. Movement to the extended position is achieved by a pneumatic actuator 78, whose push-rod 80 is aligned axially with the pin at 64B to inject it into the article 1B at the transfer station. After picking up articles, the pins are allowed to return slowly to the retracted position as at 64A by a cam track 116. Retraction is limited by engagement of the chain with stops 106 on the inner ends of the pins. In this case, the active face of the push-rod 80 extends to a position flush with the cam track, and the movement of the chain 60 transfers the outer ends of the pins smoothly from the push-rod to the cam track 116. Alternatively, the actuator 78 may be replaced by an extended cam track which extends as well as retracts the pins; however, the rise of the cam must be rather sharp as the pins approach the article to be picked up, to secure a satisfactory transfer.

While I have described preferred embodiments of my invention for purposes of illustration, it will be apparent to those skilled in the art that various changes and modifications may be made therein without departing from the true scope of the invention, which I therefore intend to define in the appended claims without limitation to the details of the foregoing embodiments.

What I claim is:

1. Article transfer mechanism comprising, in combination: an endless delivering conveyor having indexing means advancing said delivering conveyor intermittently for positioning articles serially at a transfer station, an endless receiving conveyor having continuous drive means, said receiving conveyor extending in aligned article-transfer relation to said delivering conveyor at said transfer station, a series of pin means supported for axial sliding movement in said receiving conveyor for movement between extended and retracted positions, said pin means being spaced along said receiving conveyor, first positioning means constructed and arranged to move said pin means sequentially to the extended position upon arrival thereof in aligned article-transfer relation with said delivering conveyor at said transfer station to transfer articles from said delivering conveyor into supported engagement with said pin means, control means including a switch responsive to the completion of indexing movement of said delivering conveyor for actuating said first positioning means coincident with the arrival of an article at said transfer station, and second positioning means constructed and arranged to return said pin means sequentially to the retracted position prior to a subsequent return of said pin means to the transfer station.

2. Article transfer mechanism as recited in claim 1, in which said receiving conveyor comprises a chain conveyor formed with a series of transverse openings slidably receiving said pin means.

3. Article transfer mechanism as recited in claim 1, in which at least one of said positioning means comprises an actuator having an extensible push-rod arranged for reciprocal movement with a component parallel to the axes of sliding movement of said pin means.

4. Article transfer mechanism as recited in claim 1, together with control means for said indexing means comprising a position-sensing switch arranged for response to the passage of successive pin means along the path of said receiving conveyor for energizing said indexing means in synchronism therewith.

References Cited by the Examiner
UNITED STATES PATENTS

| 1,910,713 | 5/1933 | Prussing | 118—58 X |
| 2,800,872 | 7/1957 | Remington et al. | 118—58 |
| 3,024,887 | 3/1962 | Ingham | 198—21 |
| 3,182,589 | 5/1965 | Green et al. | 118—58 |

EVON C. BLUNK, *Primary Examiner.*

A. C. HODGSON, *Assistant Examiner.*